(12) United States Patent
Cox

(10) Patent No.: US 6,461,653 B1
(45) Date of Patent: Oct. 8, 2002

(54) ICE CONFECTION WITH CONTROLLED TRANSPARENCY

(75) Inventor: David Robert Graham Cox, Rotterdam (NL)

(73) Assignee: Good-Humor-Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 09/533,570

(22) Filed: Mar. 23, 2000

(51) Int. Cl.[7] .............................. A23L 1/27; A23G 1/00
(52) U.S. Cl. ..................... 426/88; 426/104; 426/91; 426/134; 426/249; 426/383; 426/565
(58) Field of Search ............................ 426/68, 88, 91, 426/100, 101, 104, 249, 134, 383, 515, 524, 565, 250, 540

(56) References Cited

U.S. PATENT DOCUMENTS

| | | | |
|---|---|---|---|
| 1,502,006 A | 7/1924 | Alvord | 434/348 |
| 2,821,481 A | * 1/1958 | Moslo | 426/100 |
| 4,104,411 A | 8/1978 | Pooler | 426/421 |
| 4,399,153 A | * 8/1983 | Tezuka et al. | 426/5 |
| 4,979,370 A | 12/1990 | Hotaling | 62/70 |
| 5,035,911 A | 7/1991 | Somua | 426/515 |
| 5,042,860 A | * 8/1991 | Bouton | 294/5.5 |
| 5,083,815 A | 1/1992 | Scrymgeour et al. | 283/72 |
| 5,157,929 A | 10/1992 | Hotaling | 62/66 |
| 5,493,866 A | 2/1996 | Hotaling | 62/66 |
| 5,958,481 A | * 9/1999 | Hodges | 426/100 |
| 6,103,278 A | * 8/2000 | Lluch | 426/9 D |
| 6,231,901 B1 | * 5/2001 | Sharkasi et al. | 426/101 |

FOREIGN PATENT DOCUMENTS

| | | |
|---|---|---|
| EP | 0 447 733 A1 | 9/1991 |
| EP | 0 637 206 | * 11/1993 |
| JP | 62 797360 | 4/1987 |
| WO | WO 93/21776 | 11/1993 |

* cited by examiner

*Primary Examiner*—Nina Bhat
(74) *Attorney, Agent, or Firm*—Gerard J. McGowan, Jr.

(57) ABSTRACT

A frozen ice confection of fixed shape is described which has its opacity controlled in relation of the temperature of the confection. The confection may also have an imbedded indicia which becomes view able as the transparency of this frozen confection increases.

4 Claims, 3 Drawing Sheets

FIG. 5
FIG. 6
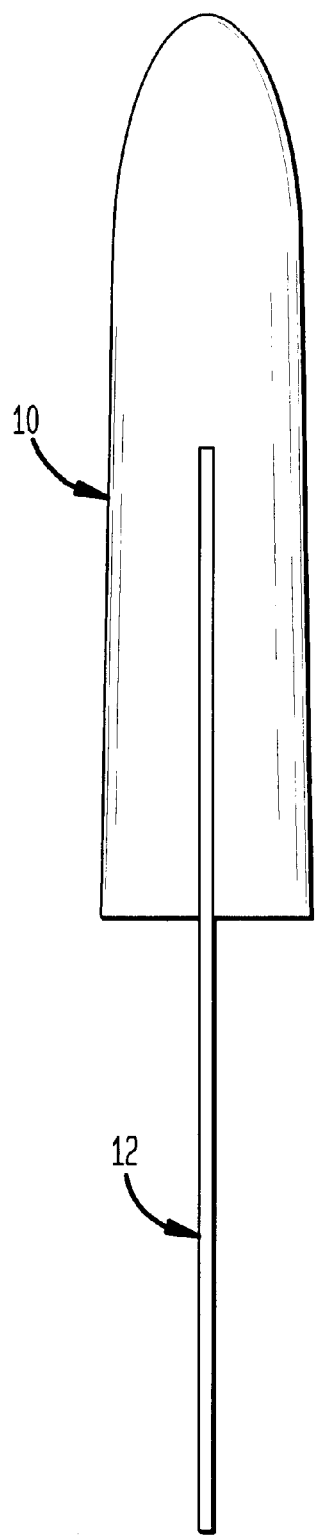
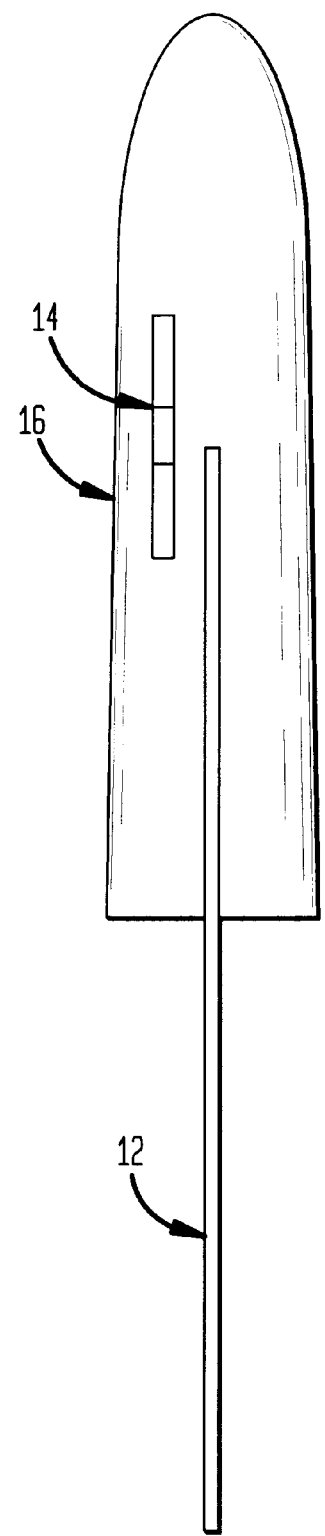

ICE CONFECTION WITH CONTROLLED TRANSPARENCY

FIELD OF THE INVENTION

This invention generally relates to an edible article which is opaque during cold storage, but which becomes transparent when warmer (e.g., during licking, sucking or by natural warming in the air). A second aspect of the invention includes placing an indicia or a "surprise" within the product, which is revealed as the product is warmed. The edible article is designed to be opaque at storage temperatures below about −18° C. The article becomes substantially transparent at eating temperatures of about 1 to 10° C. warmer than −18° C. and thus within a range of about −17° C. to −8° C. However by appropriate formulation design, different opacity temperatures may be achieved. The edible articles of the invention thus are frozen confections employing controllably transparent formulations.

In a preferred embodiment a surprise or indicia of some sort is placed within the pop so that it becomes visible as the bulk of the article becomes substantially transparent.

BACKGROUND OF THE INVENTION

There is a continuing need for novel products in the area of frozen confections. The invention, thus, provides an edible article such as an ice pop which is opaque during storage but becomes substantially transparent at eating temperatures and above.

Physically, tap water and aqueous solutions liberate dissolved gas on freezing, the liberated gas being one cause of opacity of ice cubes and frozen confections. Water ices and similar frozen aqueous based novelties containing sugars are mainly opaque due to differences in the refractive index of ice crystals and of the matrix of frozen sugar solution.

WO 93/21776 published Nov. 11, 1993 deals with edible ice pops having partial opacity and transparency, where the transparency is produced by insuring that the bulk of the product is in the non-crystalline state. In addition, the entire article may be coated with a thin transparent layer.

U.S. Pat. No. 1,502,006 to Alvord issued Jul. 22, 1924 and deals with an opaque coating on a dry room temperature lollipop candy. When the coating is removed, it reveals underlying writing which is placed on the inside of the candy. In addition, soap constructions are disclosed as being suitable for use.

EP 0447733 published Sep. 25, 1991 deals with a candy having a different core and at least a partially transparent outer portion.

U.S. Pat. No. 5,157,929 issued Oct. 27, 1992 and U.S. Pat. No. 4,979,370 issued Dec. 25, 1990 deal with producing clear ice products and ice products with patterns produced by the selective use of vacuum and/or deoxygenation. U.S. Pat. No. 5,493,866 issued Feb. 27, 1996 deals with transparent ice products.

Ice confections having controlled transparency at eating temperatures thus are seen to be desirable.

Accordingly, it is an object of the invention to produce a water ice formulation which becomes transparent in relation to selected temperatures including: selecting a formulation which has a sufficient proportion of ice crystals at a temperature of a standard cold storage freezer to render the formulation substantially opaque and insuring that the proportion of ice crystals melt either during consumption, or in the time between removal of the product from cold storage and consumption.

Yet another object is to produce a controlled transparency combination frozen water ice product including:
  a) A first material serving as an indicia within the interior of the product said indicia becoming visible as the transparency of the product increases; and
  b) A second material serving as an enrobing agent for said indicia to substantially encompass said indicia, said second material being capable of increasing in transparency with increased temperature.

The above objects are achieved by this invention which provides an edible article having a temperature below about −18° C., which is the usual storage temperature for a frozen confection. The major portion of which is transparent at a temperature of about −16° C. and above, wherein the bulk of the transparency is produced by a non-crystalline state.

This invention can also be applied to storage temperatures other than −18° C. For instance, a product can be formulated to be opaque at a storage temperature of −16° C., while being substantially transparent at −14° C.

In general, more dissolved solutes reduce the amount of ice present at a given temperature. A combination of the amount and the composition of the dissolved solutes can modify the amount of ice at various temperatures. For example, 52 wt % sucrose in 48 wt % water has about 22% ice at −18° C., and all of the ice has just melted at about −7° C., 52 wt % fructose with 48 wt % water has about 10% ice at −18° C., and all of the ice has just melted at about −13° C. Other dissolved solutes include sugars, glycerol, alcohol and their derivatives.

It is preferred to add a transparent structuring agent to the composition. If no structuring agent or ice is present, the product is a thick liquid, which is often not desirable. Examples of structuring agents are materials that significantly thicken the ice-free liquid, or form a gel. Examples of gelling agents include, but are not limited to, gelatin, iota-carrageenan, kappa-carrageenan, pectins, alginates, and locust bean gum. Some of these are set thermally (i.e., they gel below a defined temperature), e.g., gelatin or locust bean gum. Other agents require specific ions to gel (e.g., calcium ions are often used to gel iota-carrageenan, or low methoxy pectins). One skilled in the art can determine a suitable structuring agent and incorporation level through consideration of the required texture, setting process (thermal or ionic), and any additional requirements (e.g., the type and level of ions, pH, sugar concentration, strength of gel required). These considerations are well documented in the literature. Some mixtures of these structuring agents can also be used. Not all gels are transparent. The transparency of a gel for use in this invention can be determined by visual observation.

The invention also includes any frozen desserts and optionally products intended to be hand held may have a stick positioned within the product. Also, a frozen confection may contain a portion that includes the invention. For instance, a layer of a composite confection may exhibit the opaque to transparent transition, which the remainder of the confection does not.

Having generally described the invention various aspects and preferred embodiments will be described in detail with respect to the drawings wherein:

FIG. 5 is a view of the ice pop of FIG. 1 cut along the plane 5—5.

FIG. 6 is a view of the ice pop of FIG. 4 cut along the plane 6—6.

Figure 1:
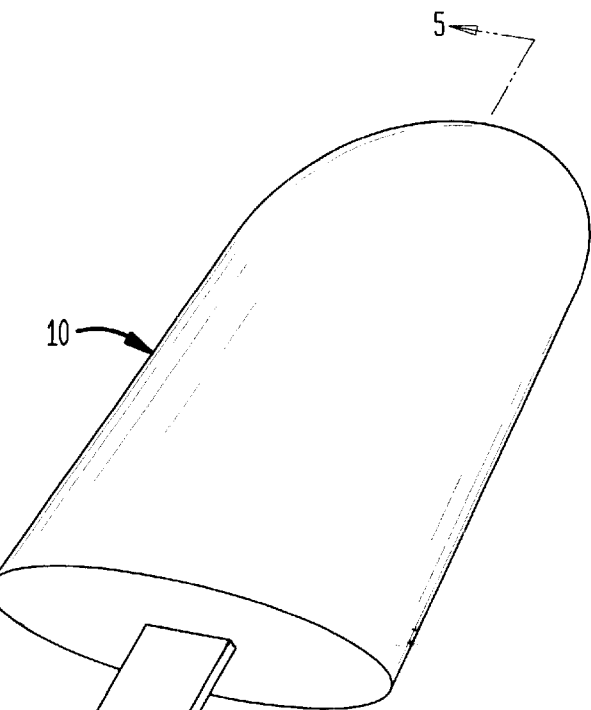
FIGS. 1 and 3 show a perspective view of an ice pop in its stored opaque stage.
Figure 3:
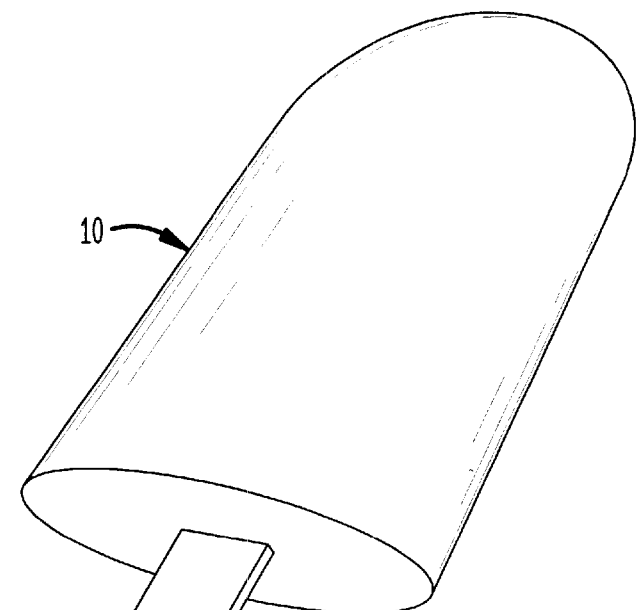

In the drawings FIGS. 1, 3 and 5 show an opaque version of the confection having an ice pop 10 on the usual wooden stick 12. FIG. 3 is similar to FIG. 1 except that an indicia, not seen, is contained within the ice pop 10.

Figure 2:
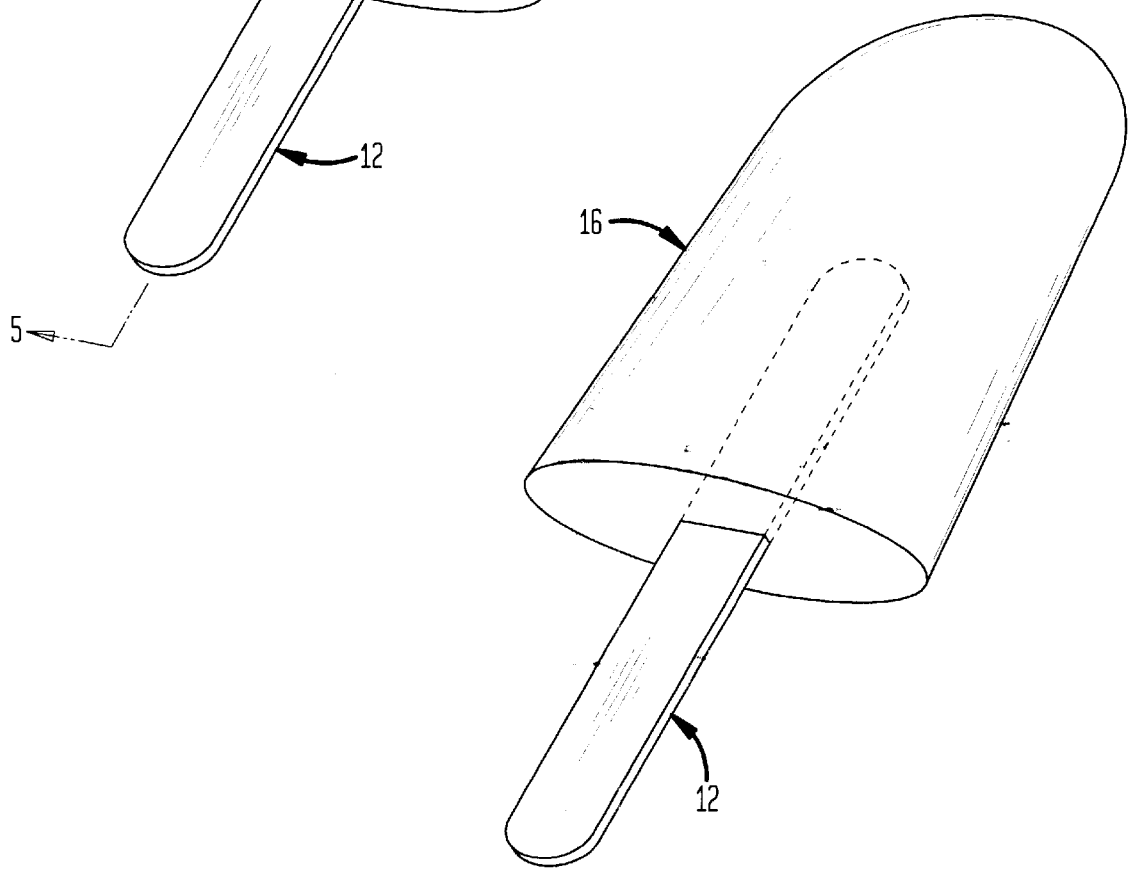
FIG. 2 is a perspective view of the ice pop of FIG. 1 in its transparent stage.
Figure 4:
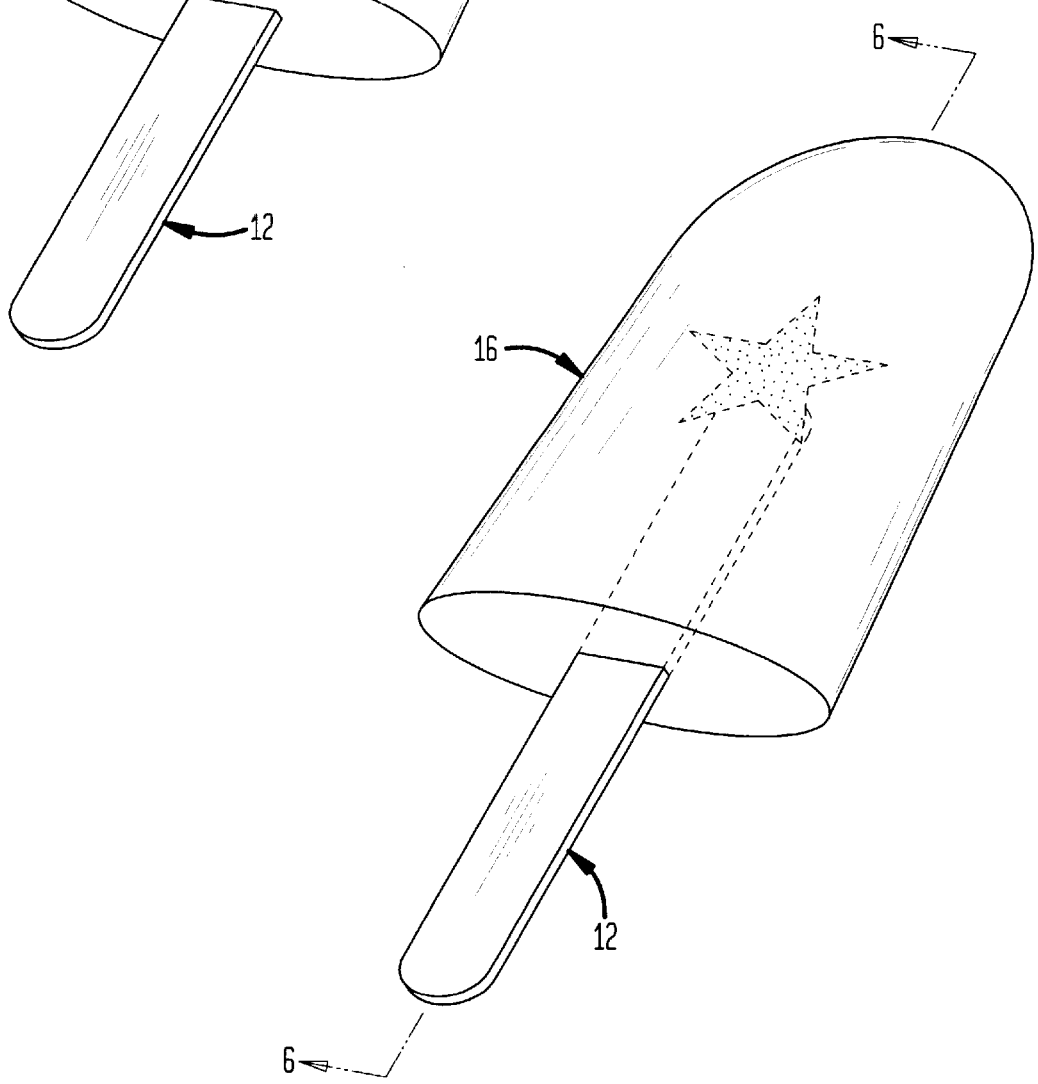
FIG. 4 is a perspective view of the ice pop of FIG. 3 in its transparent stage with an indicia inserted.

FIGS. 2, 4 and 6 show the ice pop 16 in its transparent state. The stick 12 as well as the indicia 14 have become visible in respectively FIGS. 2 and 4.

FIG. 5 shows a longitudinal section of FIG. 1 comprising an opaque frozen confection material 10 with the usual wooden stick 12 inserted and adhered in the opaque material 10.

FIG. 6 shows a longitudinal section of FIG. 4 where the confection 16 is substantially transparent and shows an inserted indicia 14.

In the following examples preferred recipes and methods will be described for manufacturing the products of the invention. All parts and proportions are by weight unless otherwise indicated.

The effect is achieved by choosing a formulation which has ice at −18° C. making the product opaque. The formulation is also such that there is no ice at −15°, which renders the product transparent. The product structure is held together by a binding agent (e.g., gelatin). The product can also be colored.

EXAMPLE 1

Products have been made containing 53% fructose, 4% gelatin, 0.2% citric acid, 0.3% orange color/flavor and 42.5% water. FIGS. 3 and 4 are illustrative of this example. These products are believed to contain about 5% ice at −18° C. and no ice at −15° C.

The composition above was mixed and at 45° was poured into a mold, which was then cooled by brine at −15° C. A candy was placed within this mix, and a stick inserted. After 30 minutes, the gelled product (no ice) was removed from the mold. The product was a transparent orange. On storage at −30° C., the product became an opaque orange (with ice), and the candy was not visible. Upon licking/sucking of the stored product, the temperature increased to a point at which the product became transparent, revealing the candy within.

EXAMPLE 2

FIGS. 1 and 2 are illustrative of the embodiments of the following compositions that under go the opaque to transparent transition.

Ranges of compositions were made with various dissolved sugars. These sugars were sucrose, fructose, and 42DE High Fructose Corn Syrup (HFCS). All compositions contained 4 wt % gelatin (225 bloom), 45 to 75 wt % sugars, with the remainder being water.

Conventional ice confection molds were filled with each composition, and a conventional wooden stick was placed into the mold. The molds were cooled in a glycol/water solution at −19° C. After 30 minutes, the products were removed from the mold, then placed in a cold storage at −30° C. for at least 18 hours.

The products were placed in a freezer set at various temperatures. These temperatures were −26° C., −20° C., −18° C., −14° C. and −12° C. These products were inspected after remaining in the freezer for two hours.

a) The sugar used was 55 wt % HFCS. The product was opaque at all temperatures between −26° C. and −12° C.

b) The sugar used was 45 wt % sucrose. The product was opaque at all temperatures between −26° C. and −12° C.

c) The sugar used was 65 wt % sucrose. The product was completely opaque at −26° C., although there was a small degree of transparency. At −20° C., the product was almost completely transparent (the wooden stick was clearly visible, and external objects could be seen through the product). The product was completely transparent at −18° C.

d) The sugar used was 75 wt % HFCS. The product was opaque at −26° C. −20° C., and −18° C. The product became more transparent and less opaque at temperatures of −16° C. and −14° C. At −12° C., the product was transparent.

e) The sugar used was 45 wt % fructose. The product was opaque at −26° C. −20° C., and −18° C. The product became more transparent and less opaque at temperatures of −16° C. and −14° C. The product was transparent at −12° C.

f) The sugar used was 55 wt % sucrose. The product was opaque at −26° C. −20° C., −18° C. and −16° C. The product became more transparent and less opaque at temperatures of −14° C. and −12° C.

g) The sugar used was 65 wt % fructose. The product was transparent at all temperatures between −26° C. and −12° C.

Various embodiments can be envisioned including different shapes, different compositions and different inserts in the transparent portion. Inserts may also be attached to the inward end of the stick.

As used herein, the word "comprising" is intended to mean including but not necessarily "consisting essentially of", "consisting of" or "composed of". In other words, "comprising" the listed steps or options need not be exhaustive.

Except in the examples, or where otherwise explicitly indicated, all numbers in this description indicating amounts of material or conditions of reaction, physical properties of materials and/or use are to be understood as modified by the word "about." All amounts are by weight of the composition, unless otherwise specified.

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A controlled transparency combination frozen ice confection product comprising
    a) A first material serving as an indicia within the interior of the product said indicia becoming visible as the transparency of the product increases; and
    b) A second material serving as an enrobing agent to substantially encompass said indicia said second material being capable of increasing in transparency with increased temperature while still retaining its shape.

2. A combination frozen ice confection product containing a substantially internal indicia within a matrix of water ice. The compositions of said water ice being adjusted so that the transparency of said water ice increases with increasing temperature while still retaining its shape to reveal the indicia at a predetermined temperature and moisture level.

3. A combination frozen ice confection product containing an at least partially occluded internal indicia within a fixed shape matrix of water ice, the transparency of said matrix being proportional to the temperature and moisture level of said matrix to more clearly reveal the indicia at a predetermined temperature range and moisture level range.

4. A controlled transparency water ice product of fixed shape comprising a water ice composition which increases in transparency with increasing temperature and moisture.

* * * * *